United States Patent [19]

White et al.

[11] 4,382,163
[45] May 3, 1983

[54] MICROCOMPUTER CONTROLLED KEY TELEPHONE LINE CIRCUIT

[75] Inventors: Thomas E. White, Margate, Fla.; Paul U. Lind, Lombard, Ill.

[73] Assignee: GTE Automatic Electric Labs Inc., Northlake, Ill.

[21] Appl. No.: 286,834

[22] Filed: Jul. 27, 1981

Related U.S. Application Data

[63] Continuation-in-part of Ser. No. 81,582, Oct. 3, 1979.

[51] Int. Cl.³ .............................................. H04Q 5/18
[52] U.S. Cl. ........................ 179/99 LC; 179/99 LS; 179/18 FA
[58] Field of Search ............ 179/99 R, 99 M, 99 LC, 179/99 LS, 18 FA, 81 R

[56] References Cited

U.S. PATENT DOCUMENTS

| | | |
|---|---|---|
| Re. 29,078 | 12/1976 | Tate .................................. 179/99 M |
| 4,046,972 | 9/1977 | Huizinga et al. ................. 179/99 M |
| 4,092,501 | 5/1978 | Suzuki et al. ...................... 179/99 M |
| 4,160,131 | 7/1979 | Kaul et al. ......................... 179/99 M |
| 4,322,581 | 3/1982 | Christain et al. ................. 179/99 M |
| 4,327,256 | 4/1982 | Crooks et al. .................... 179/18 FA |

Primary Examiner—Gerald L. Brigance
Attorney, Agent, or Firm—Robert J. Black; Gregory Hendricks

[57] ABSTRACT

A microcomputer controlled key telephone line circuit for use in a key telephone. A microcomputer is used to sequentially and alternately scan the ringing leads and tip and ring leads associated with connected line circuits and A leads associated with connected telephone stations. The microcomputer operates in response to changes in the status of these leads to control the normal key telephone functions such as line pickup, hold and ringing current detection, lamp illumination and tone signaling.

6 Claims, 7 Drawing Figures

MICROCOMPUTER CONTROLLED KEY TELEPHONE LINE CIRCUIT

This application is a continuation-in-part of our application Ser. No. 81,582, filed on Oct. 3, 1979 (now abandoned).

BACKGROUND OF THE INVENTION (1) Field of the Invention

The present invention relates to key telephones and more particularly to a microcomputer controlled key telephone line circuit for use in a key telephone system.

(2) Description of the Prior Art

Key telephone common circuits have traditionally been electromechanical in nature however recently electronic versions of these circuits have been patented. U.S. Pat. No. 3,952,169 issued on Apr. 20, 1976 to O. W. Vincent discloses the use of discrete logic and solid state switches to perform the key telephone functions. U.S. Pat. No. 4,057,693 issued on Nov. 8, 1977 to R. J. Angner however is more representative of the recent prior art. Angner uses a custom large scale integration chip to replace the logic which performs the key telephone common functions. However this chip only controls the functions for one line and is not suitable for use in a self-contained key telephone system such as the applicants' key telephone system. Bell Telephone Laboratories has recently developed a Com-Key 416 key telephone system which is similar to the applicants' key telephone system. However, in the Bell Com-Key system the common functions are provided by multiple custom large scale integration chips designed specifically to perform their limited purpose. Also these chips provide only logic control and interrrupt functions, while tone ringers and clock circuitry are external to the large scale integration chips. Also many of the required timing functions are performed by resistor-capacitor networks. Thus the Com-Key 416 key telephone system uses a large number of balky components to perform the key telephone line circuit functions.

Accordingly, it is an object of the present invention to provide a novel, low cost, minimum component technique of performing the key telephone line circuit functions.

SUMMARY OF THE INVENTION

The microcomputer controlled key telephone line circuit of the present invention provides the standard key telephone functions such as line pickup, hold and ringing detection, lamp illumination and tone signalling. The use of microcomputer control to provide these functions is novel, low cost and highly efficient method of providing the standard key telephone functions associated with a line circuit. This circuit can be housed in a standard key telephone and operates to control two liens and multiple stations.

The circuit consists of a microcomputer connected between a ringing detection circuit, a line relay, loop relay, an A-lead detection gate, a lamp control gate and a common audible control gate for each of two lines. The microcomputer continuously scans the ringing detection leads and the A-lead detection leads to detect the presence of an incoming call or the origination of an outgoing call. The status of the A-lead indicates to the microcomputer either the operation of a line pickup key or the operation of a hold key associated with one of the stations connected to the microcomputer. Upon detection of an incoming call the microcomputer will output a lamp flash signal to the lamp lead and a warble (two frequency) tone to the common audible lead. Upon operation of a line pickup key the microcomputer will output a steady lamp signal to the lamp lead and remove the warble tone from the common audible lead. Upon operation of the hold key the microcomputer will output a lamp wink signal to the lamp lead and will apply a tone-on-hold signal to the tip and ring leads. Thus the microcomputer provides the control fucntions of the line circuit, and generates the timing signals and tone signals.

DESCRIPTION OF THE PREFERRED EMBODIMENT

Figure 1:
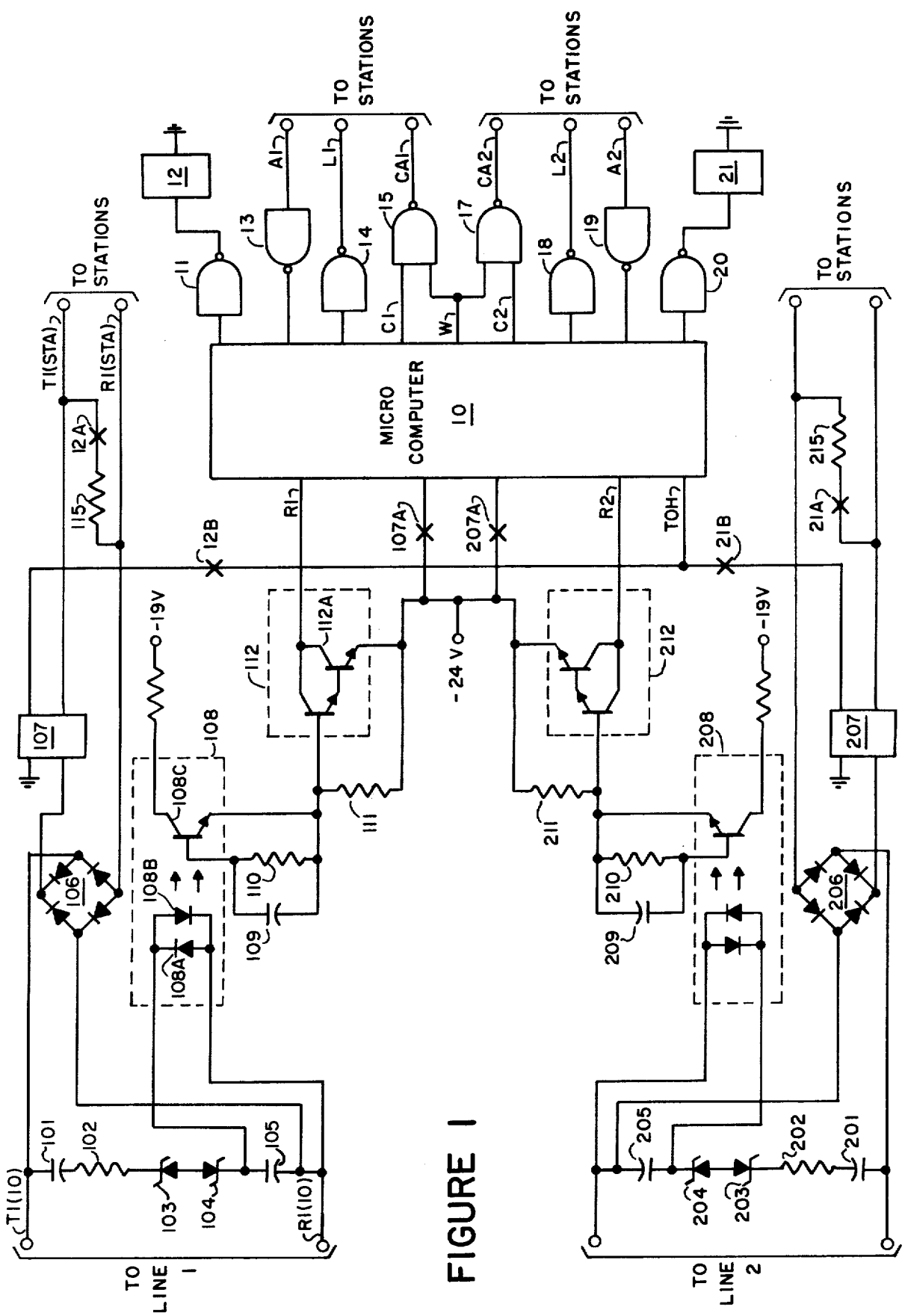
FIG. 1 is a circuit diagram of a microcomputer controlled key telephone line circuit in accordance with the present invention.

Referring now to the accompanying drawing, the microcomputer controlled key telephone line circuit of the present invention is shown connected to line 1 and line 2. The common circuit includes the series combination of capacitor 101, resistor 102, zener diodes 103 and 104, and capacitor 105 connected across the tip and ring leads of line 1. Bridge 106 is also connected across the tip and ring leads of line 1 and is further connected to the series combination of line relay 107, contacts 12A and resistor 15. Optical coupler 108 is connected across capacitor 105 and the base of phototransistor 108C is connected to the parallel combination of capacitor 109 and resistor 110. The emitter of phototransistor 108C is connected to transistors 112 whose collector lead is connected to microcomputer 10. The emitter lead of transistor 112A is connected to microcomputer 10 via contact 107A. Similar circuitry is connected between line 2 and microcomputer 10. Loop relay 12 is connected to microcomputer 10 via gate 11. The A-lead associated with station one is connected to microcomputer 10 via gate 13 and a lamp associated with station one is connected to microprocessor 10 via gate 14. The common audible lead, Cal, associated with station one is connected to gate 15 which is connected to microcomputer 10 via leads W and Cl. Line relay 107 is further connected to microcomputer 10 via contacts 12B. Similar circuitry is connected between station two and microcomputer 10.

The operation of the microcomputer controlled key telephone line circuit of the present invention will be described with reference to line 1 since line 2 operations are identical to those of line 1. This circuit controls the standard key telephone functions such as line pickup, hold and ringing current detection, lamp illumination and tone signaling. Microcomputer 10 sequentially and alternately scans the inputs from lines 1 and 2 every 10 milliseconds. Thus it scans, for example, the A-lead associated with line 1, followed by the A-lead associated with line 2, before scanning the next lead associated with line 1.

When an incoming call is connected to the line circuit, ringing current is applied to the tip and ring leads, T1 (CO) and R1 (CO). Zener diodes 103 and 104 breakdown to this ringing signal voltage and conduct current to optical coupler 108. Since there are dead periods, during the zero crossing transition, in a ringing cycle during which photodiodes 108A and 108B do not conduct, capacitor 109 supplies the base current to phototransistor 108C during these dead periods. Phototransistor 108C thus turns on in response to the ringing signal and causes transistors 112 to turn on and generate a logic 0 signal on lead R1. Microcomputer 10 detects and validates this logic 0 signal and outputs a lamp flash signal (1 pulse per second, 50% duty cycle) to lead L1 via gate 14. Microcomputer 10 also applies a warble tone to lead W and enables gate 15 via lead C1 thereby applying the warble tone to common audible lead Ca1. Upon operation of a line pickup key associated with station 1 an A-lead signal will be applied to microcomputer 10 via gate 13. Microcomputer 10 responds to the A-lead signal by outputting a steady lamp signal to lead L1 via gate 14. Microcomputer 10 also removes the common audible enable signal from lead C1 and the warble tone from lead W thereby removing the common audible signal from lead Ca1. Line relay 107 operates in response to connection of the tip and ring leads, T1 (STA) and R1 (STA), to station 1. Line relay contacts 107A close in response to operation of relay 107 and apply a minus 24 volt signal (logic 0) to microcomputer 10 to indicate operation of the line relay.

The operation of the microcomputer controlled key telephone line circuit is the same, as above described, for placing an outgoing call. In this case however ringing current is not initially detected and microcomputer 10 is in a scanning mode and initially responds to operation of a line pickup key associated with station one, as detected on the A1 lead via gate 13.

If the hold button associated with station 1 is depressed it will initially cause the A1 lead to become deactivated. Microcomputer 10 will detect this state of the A1 lead via gate 13 and apply a lamp wink signal to lead L1 via gate 14. The lamp wink signal is a 500 millisecond signal with a 90% duty cycle providing a 450 millisecond period during which the lamp is on and a 50 millisecond period during which the lamp is off.

Microcomputer 10 also operates in response to deactivation of the A1 lead to operate loop relay 12. Contacts 12A are closed in response to operation of loop relay 12 thereby connecting resistor 115 in shunt across the tip and ring leads. Resistor 115 provides a holding bridge across the tip and ring leads to present a loop to the central office via line 1 when complete depression of the hold key disconnects station 1 from the tip and ring leads. Operation of loop relay 12 also causes contacts 12B to close thereby connecting a tone on hold source from microcomputer 10 to a winding of line relay 107. Microcomputer 10 generates a continuous tone burst for 100 milliseconds every 10 seconds to provide a tone on hold signal. Since this signal is applied to a winding of loop relay 12 it is coupled on to the tip and ring winding of relay 12 thereby providing the tone on hold signal to line 1. If the hold condition of station 1 is removed by depressing a line pickup key, microcomputer 10 will detect the presence of an active A-lead via a gate 13 and release relay 12 thereby removing the bridge resistor from the tip and ring leads and also disconnecting the tone on hold lead from line relay 108. Microcomputer 10 will further remove the lamp link signal from lead L1 and apply a steady lamp signal via gate 14. Also, if a call on-hold is abandonded by the held party, microcomputer 10 will detect the absence of loop current and after 450 milliseconds will remove the hold bridge thus dropping the connection.

Microcomputer 10 has 5 modes of operation, idle (on-hook), A-lead timing, off-hook, on-hold, and ringing. During the idle mode microcomputer 10 scans A-leads, A1 and A2, and ringing leads, R1 and R2. Microcomputer 10 scans these leads once every 10 milliseconds and upon detection of an Active A-lead it will operate in the A-lead timing mode while upon detection of an active ringing lead it will operate in the ringing mode. From the ringing mode of operation, the idle mode can be entered if the ringing signal was invalid and the A-lead timing mode can be entered if an A-lead becomes active in the ringing mode. From the A-lead timing mode the idle mode will be entered if the active A-lead was invalid while the off-hook mode will be entered upon detection of a valid A-lead signal. If the A-lead becomes inactive while in the off-hook mode of operation the on-hold mode will be entered and if the tip and ring leads become inactive while the A-lead is inactive microcomputer 10 will return to the idle mode of operation. If the A-lead becomes active in the on-hold mode of operation microcomputer 10 will return to the A-lead timing mode of operation.

A detailed description of these five modes of operation follows. The idle mode of operation is a supervisory state during which ringing leads and A-leads are continuously scanned once every 10 milliseconds to detect an incoming call via the ringing leads and origination of an outgoing call via the A-leads. As stated previously upon detection of an active A-lead representing an outgoing call origination, the A-lead timing mode will be entered while upon detection of an active ringing lead representing an incoming call the ringing mode of operation will be entered.

In the ringing mode of operation microcomputer 10 will scan the active ringing lead once every 10 milliseconds and upon detection of a valid ringing signal represented by 125 milliseconds of continuous ringing signal microcomputer 10 will output a lamp flash signal to lead L1. It will also output a warble tone to common audible lead Ca1. If an invalid ringing signal had been detected as represented by less than 125 milliseconds of continuous ringing signal microcomputer 10 will reenter the idle mode of operation. Thus the A-lead timing mode of operation is entered via detection of an active A-lead in the idle mode of operation in response to origination of an outgoing call and it is also entered via detection of an active A-lead in the ringing mode of operation. The A-lead becomes active in either case in response to operation of a line pickup key which is operated either for call origination, or in response to lamp flash and common audible tone for an incoming call.

In the A-lead timing mode of operation microcomputer 10 continuously scans the A-lead once every 10 milliseconds and upon detection of a valid A-lead as represented by 50 milliseconds of a continuously active A-lead, microcomputer 10 will output a steady lamp signal, remove the warble tone from the common audible lead and then enter the off-hook mode of operation. If the A-lead had been invalid as represented by less than 50 milliseconds of a continuously active A-lead signal microcomputer 10 will reenter the idle state.

In the off-hook mode of operation microcomputer 10 will continuously scan the A-lead and upon detection of an inactive A-lead for greater than 50 milliseconds while the tip and ring leads remain active, microcomputer 10 will enter the on-hold mode of operation. If the call becomes abandoned as represented by the tip and ring leads becoming inactive within 50 milliseconds of the A-lead becoming inactive microcomputer 10 will reenter the idle mode of operation.

In the on-hold mode of operation if the A-lead becomes active again for 20 milliseconds microcomputer 10 will reenter the A-lead timing mode of operation while if the tip and ring leads become inactive for 450 milliseconds the microcomputer will reenter the idle mode of operation since the call was abandonded.

The microcomputer controlled key telephone line circuit of the present invention is controlled by microcomputer 10 in accordance with a program stored in its memory. A representative example of a microcomputer which can be adapted to the present invention is the Intel 8048. Microcomputers are well known and other comparable microcomputers could be adapted to the present invention by those skilled in the art.

The microcomputer controlled key telephone line circuit of the present invention thus performs the standard key telephone functions of line pickup, hold detection, ringing current detection, lamp illumination and tone signaling under control of a microcomputer. While the microcomputer controlled key telephone line circuit of the present invention can be connected to numerous stations only 2 stations were shown in the preferred embodiment since microcomputer 10 is shown connected to only 2 lines. Additional lines and stations could be connected to microprocessor 10 since the capacity of such a system can be increased through use of microcomputers with additional processing capability.

MICROCOMPUTER OPERATION

The operation of the present inveniton is now described with reference to the program flow of the microcomputer.

Figure 2:
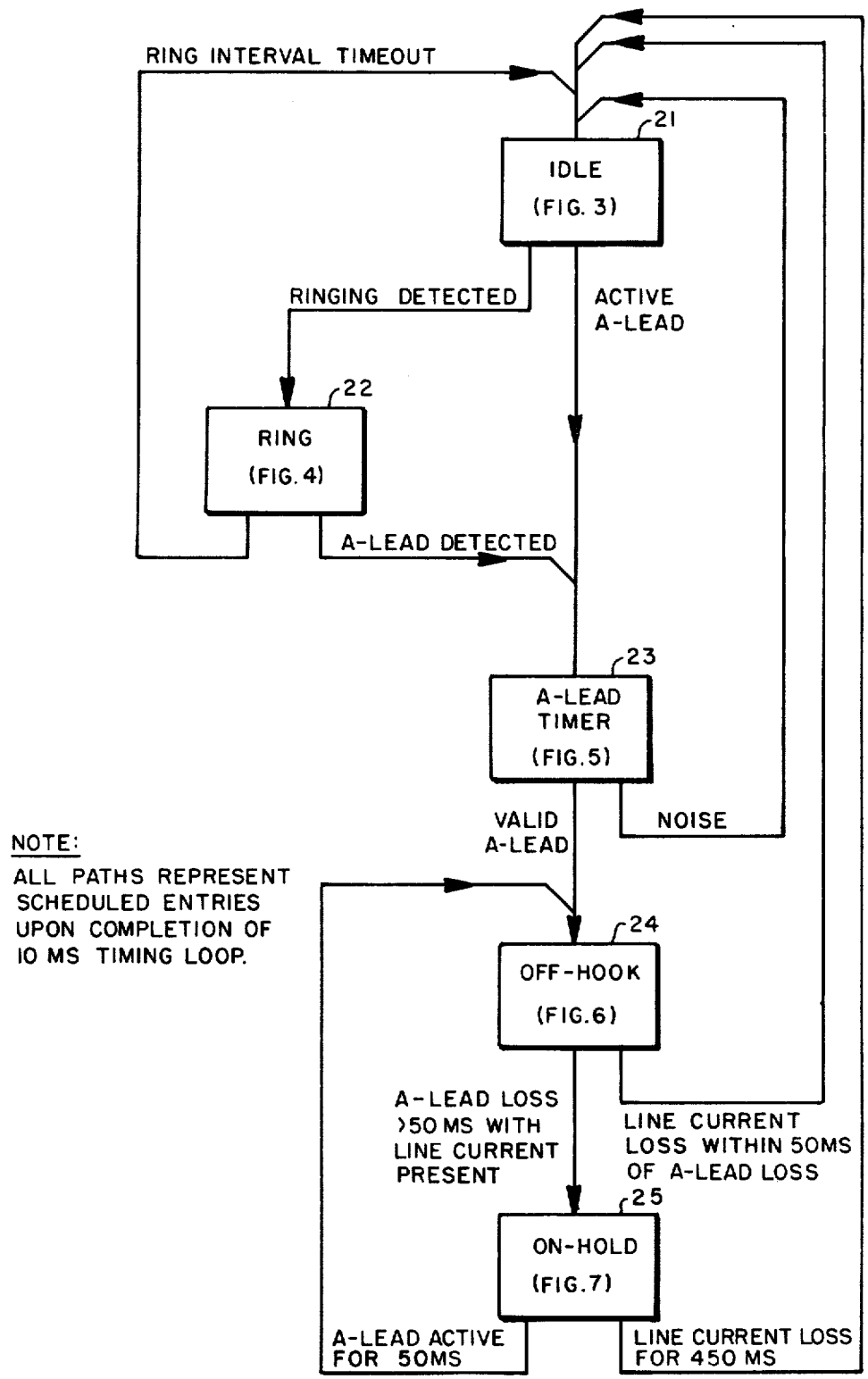
FIG. 2 is a block diagram showing the changes of state of the microcomputer.

Referring now to the state change diagram of FIG. 2, the five sub-routines corresponding to the associated five circuit states of the present invention are shown. During each 10 millisecond (ms) scan the program enters the state computed in the previous scan and uses new hardware input data to determine the state to be entered on the next scan. This computed state will later be described as having "scheduled entry or re-entry points". FIG. 2 shows only those entry points involved in state changes. If no state change is required, as determined within a state routine, that routine schedules re-entry to itself.

Typically many hundreds of scans occur before there is a change of state. The scheduled exit from and re-entry to given routine, even if no state change is required, serves two major purposes. First, all hardware inputting of A-Lead, line current and ringing data, and all hardware outputting of the computed lamp, relay, and audible tone signals is performed during the scan before entry (or re-entry) to the current state routine. Second, entry and re-entry at regular 10 ms intervals allows any of the 5 routines to carry out necessary timing functions without reference to external timers by a simple register decrement during each scan. This will be described in more detail in the state routine flow chart descriptions.

The changes in state are described with reference to only one of the two lines served by the microcomputer since the microcomputer performs the same operations for each line on alternate line basis. For a given line, the microcomputer may be considered to be continuously in one of the five states because of the definite and scheduled re-entry formulated before leaving that state routine.

The processor is initialized during power up conditions to go into the IDLE state (21). The IDLE sate can be exited upon detection of a ringing signal or an active A-lead. If a ringing signal is detected on the R1 input lead (FIG. 1) after a predetermined number of milliseconds, the associated line is determined to have a ringing signal applied to its. Appropriate output signals are then generated to provide a warble tone on the C1 output lead (FIG. 1) and the RING state is then entered on the next scan for this line.

The microcomputer will remain in the RING state (22) until conditions are such that it will either return to the IDLE state or enter the A-LEAD TIMER state. If the ringing signal remains absent from the line for an excessive amount of time, a ringing interval time-out condition is detected and a microcomputer returns to the IDLE state. However, if during the presence of the ringing signal or a valid silent interval, an A-lead signal is detected on lead A1 (FIG. 1) the microcomputer will exit the RING state and enter the A-LEAD TIMER state (23) on the next scan.

If the A-lead signal remains valid for a predetermined time while the microcomputer is in the A-LEAD TIMER state the microcomputer will enter the OFF-HOOK state on the next scan. However, if noise is detected on lead A1 the microcomputer returns to the IDLE state since the A-lead signal was invalid.

While in the OFF-HOOK state (24) the microcomputer scans contact 107A (FIG. 1) for line current, and as long as the A-lead signal is valid and line current remains applied to this contact the microcomputer will remain in the OFF-HOOK state. When the microcomputer leaves the OFF-HOOK state it can enter either the ON-HOLD state or return to the IDLE state.

The microcomputer returns to the IDLE state upon detection of loss of line current within 50 milliseconds of loss of the A-lead signal on lead A1. These two signals terminate within 50 milliseconds of each other only when the line is going on-hook and under such conditions the microcomputer returns to the IDLE state. However, if the A-lead signal is lost for more than 50 milliseconds and line current remains active then the subscriber station associated with this line has gone into the hold condition and therefore the microcomputer enters the ON-HOLD state on the next scan.

From the ON-HOLD state (25) the microcomputer can either return to the OFF-HOOK state or to the IDLE state. If the line current disappears for a predetermined time, approximately 450 milliseconds the microcomputer assumes that the line went on-hook and therefore the microcomputer returns to the IDLE state. However, if the A-lead again becomes active while in the ON-HOLD state this represents a removal of the hold condition and therefore the microcomputer will return to the OFF-HOOK state on the next memory scan.

While in the ON-HOLD state the microcomputer provides a visual indication that the line is on hold by causing a periodic signal to be applied to the L1 lead (FIG. 1) to cause an associated lamp to flash. While in this state the microcomputer also operates Relay 12 (FIG. 1) which causes Registor 115 (FIG. 1) to be connected across the line via contacts 12A (FIG. 1) and thereby provide a holding bridge across the line to allow line current to continue to flow.

FIGS. 3 thru 7 are flow charts detailing the computations performed during a particular scan while the microcomputer is in one of these five states. An oval represents a scheduled entry or re-entry point, and a "computer card" symbol indicates scheduling of the next entry point and exit to the 10 ms timing loop. Letters Y and N on decision block paths signify YES and NO respectively.

Figure 3:
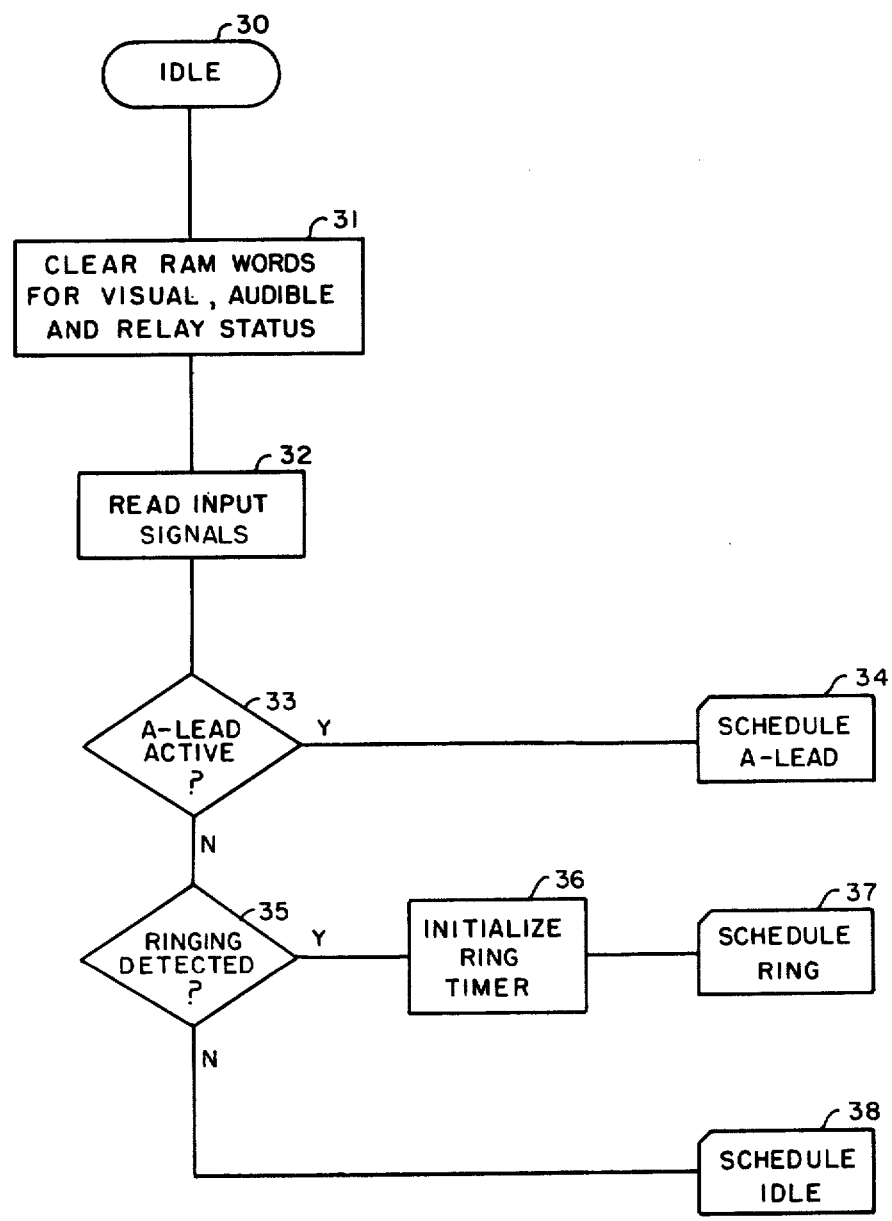
FIG. 3 is a flow chart of the Idle state of the microcomputer.

Referring now to FIG. 3 the IDLE state flow chart is shown. Upon entering the IDLE state the microcomputer clears its memory locations (31) for storage of output data associated with the line. The microcomputer then reads the current line input word (32) to determine the status of the hardware leads connected to the microcomputer. If the A-lead signal on lead A1 is active the microcomputer schedules the A-LEAD routine (34). However, it the A-lead signal is not active, the microcomputer checks to see if the ringing signal was detected and if not it reschedules the IDLE state (38). However, if the ringing signal was active the microcomputer initializes the ringing interval timer and schedules the RING state (37) to be entered on the next scan.

Figure 4:
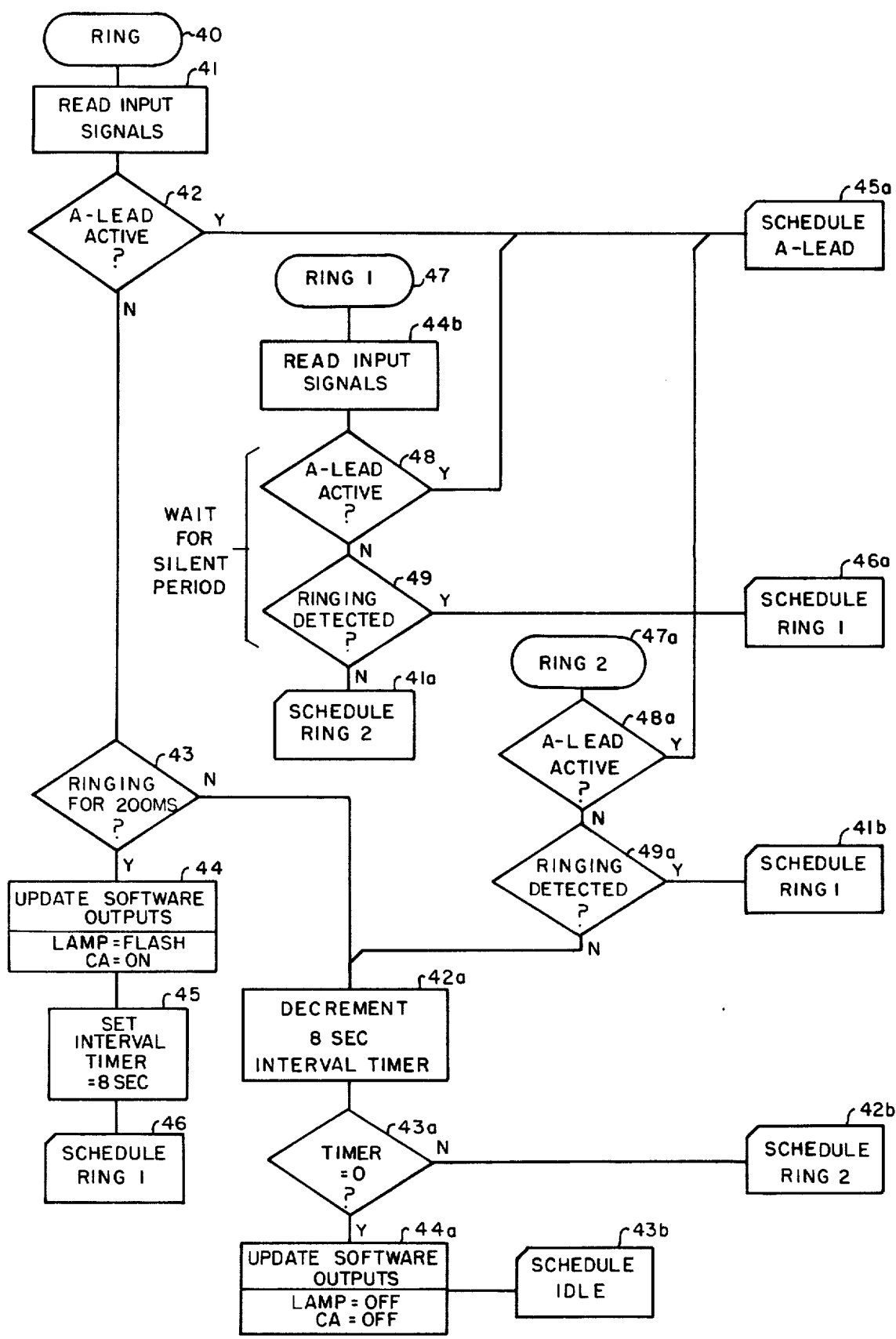
FIG. 4 is a flow chart of the Ring state of the microcomputer.

Referring now to FIG. 4 a flow chart associated with the RING state is shown. This flow chart includes three entry lines to the RING state, namely, RING, RING 1 and RING 2. Entry points RING 1 and RING 2 are scheduled by the microcomputer while in the RING state while the RING entry line is scheduled by the microcomputer when it is in the IDLE state.

Upon entering the RING state via the RING entry point (40) the microcomputer first determines whether the A-lead signal on lead A1 is active. If it is, the microcomputer schedules the A-LEAD routine (45a). If the A-lead signal is not active the microcomputer monitors the presence of ringing signal for 200 milliseconds. If the ringing signal is present for that amount of time the microcomputer sets memory bits to cause a lamp associated with the line to flash via lead L1 (FIG. 1) and it also sets a bit to cause a common audible signal to be generated via leads C1 and CA1 (FIG. 1). The interval timer is then set to 8 seconds (45) to cause a time-out if ringing signal is absent for 8 seconds. The microcomputer then schedules entry pont RING 1 (46) for the next scan.

Upon entering entry point RING 1 (47) the microcomputer again checks the A-lead to determine whether it is active and if it is so detected to be active the microcomputer schedules the A-LEAD TIMER state (45a) for the next scan. If the A-lead is not active the microcomputer then checks for the presence of ringing signal. If the ringing signal is detected the microcomputer again schedules entry point RING 1 (46a) which causes the RING state to be repetitively rescheduled as long as the ringing signal is active and the A-lead is inactive. If ringing is not detected the microcomputer schedules entry point RING 2 (41a). Upon entering at RING 2 (47a) on the next scan the microcomputer again checks for presence of the A-lead signal and if it is present the microcomputer schedules the A-LEAD TIMER state (45a) for the next scan.

However, if ringing is detected the microcomputer then schedules the RING entry point (41b) for the next scan, signifying the resumption of ringing voltage after a silent interval.

If the ringing signal disappears and the A-lead remains inactive the interval timer is decremented (42a). The interval time can be decremented in response to the microcomputer gaining control via either the RING entry point of the RING 2 entry point. In either case the microcomputer, after decrementing the interval timer, tests to see whether it has reached the value of 0. If it has the microcomputer considers the line to be in a call abandoned condition and turns off the lamp flashing signal and the common audible signals (44a) and then schedules the IDLE state (43b) for the next scan. If the inverval time has not yet reached a value of 0 the microcomputer reschedules the RING state via RING entry point RING 2 (42b) for repeated decrementing of the interval timer until it reaches 0, and the call is considered abandoned, or until an A-lead signal is detected before the interval timer reaches 0. In the latter case the A-LEAD TIMER state is scheduled for the next scan.

Figure 5:
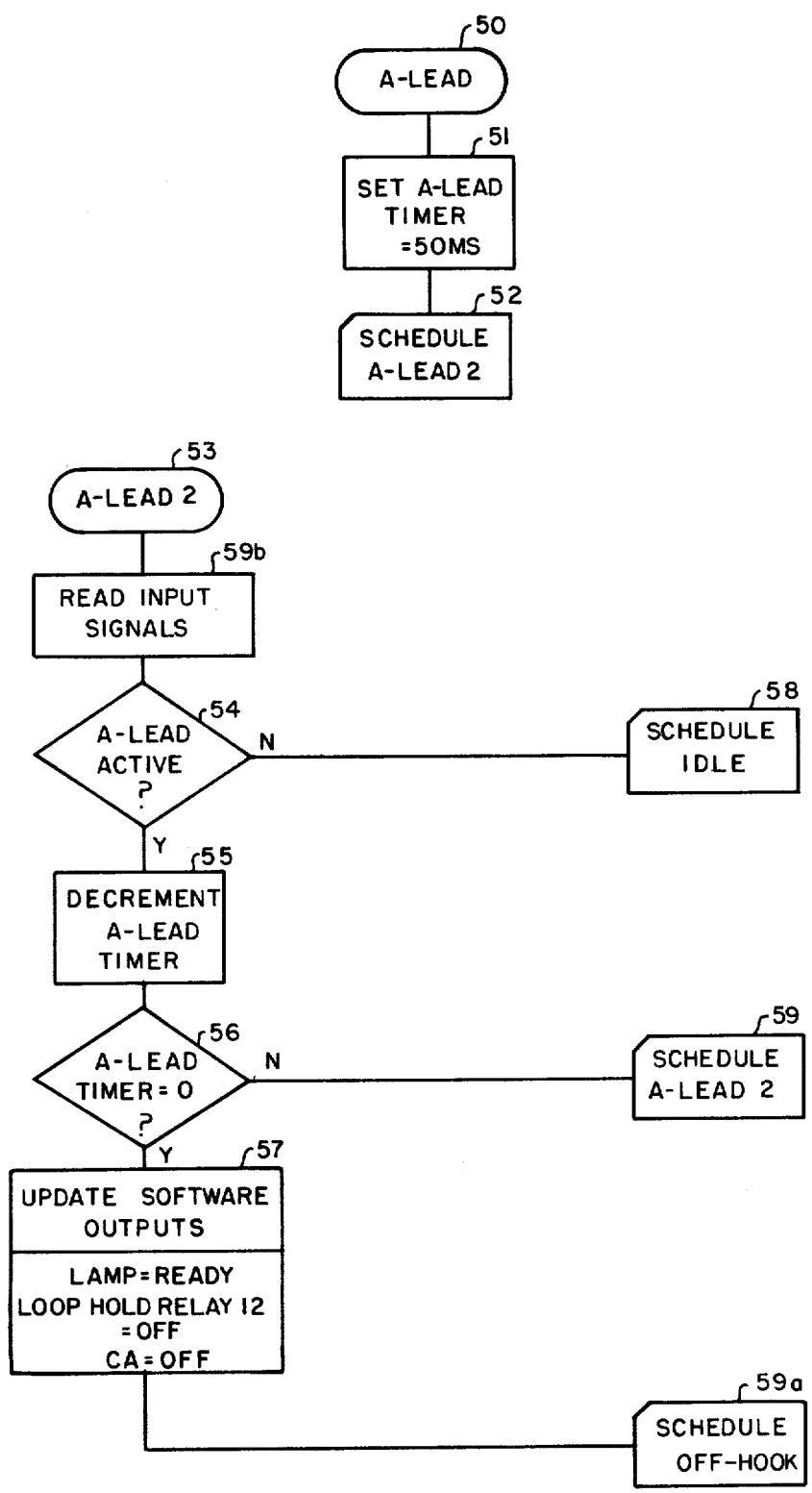
FIG. 5 is a flow chart of the A-Lead Timer state of the microcomputer.

Referring now to FIG. 5, a flow chart associated with the A-LEAD TIMER state is shown. The A-LEAD TIMER state has two entry points, namely A-LEAD and A-LEAD 2. The A-LEAD 2 entry line is scheduled only by the A-lead state while the A-LEAD entry line is scheduled by other state routines.

Upon entering the A-LEAD TIMER state from either the RINGING or IDLE state via entry point A-LEAD (50) the microcomputer sets the A-lead timer register for 50 milliseconds and then schedules entry point 2, i.e. A-LEAD 2 (52) of the A-LEAD TIMER state for the next scan.

Upon entering the A-LEAD TIMER state via the A-LEAD 2 entry point (53) the microcomputer checks for an active A-lead signal. If there is no such signal the microcomputer schedules the IDLE state (58) for the next scan while if the A-lead signal is detected as being active the microcomputer decrements the A-lead timer register (55) and then tests it for a value of 0 which represents a valid A-lead signal, since it would have been present for 50 milliseconds.

If the A-lead timer register has not yet reached a value of 0 the microcomputer reschedules A-LEAD TIMER routine via entry point A-LEAD 2 (59). However, if the 50 millisecond period has expired the A-lead signal is declared valid, and after determining the line number associated with this A-lead signal, the microcomputer sets the bits required to generate a steady lamp signal on lead L1, turns off the audible ringing signal by resetting the bits associated with the common audible, CA lead, and releases loop holding relay 12 to prevent erroneous hold conditions (57). The microcomputer then schedules the OFF-HOOK state (59a) for the next scan.

Figure 6:
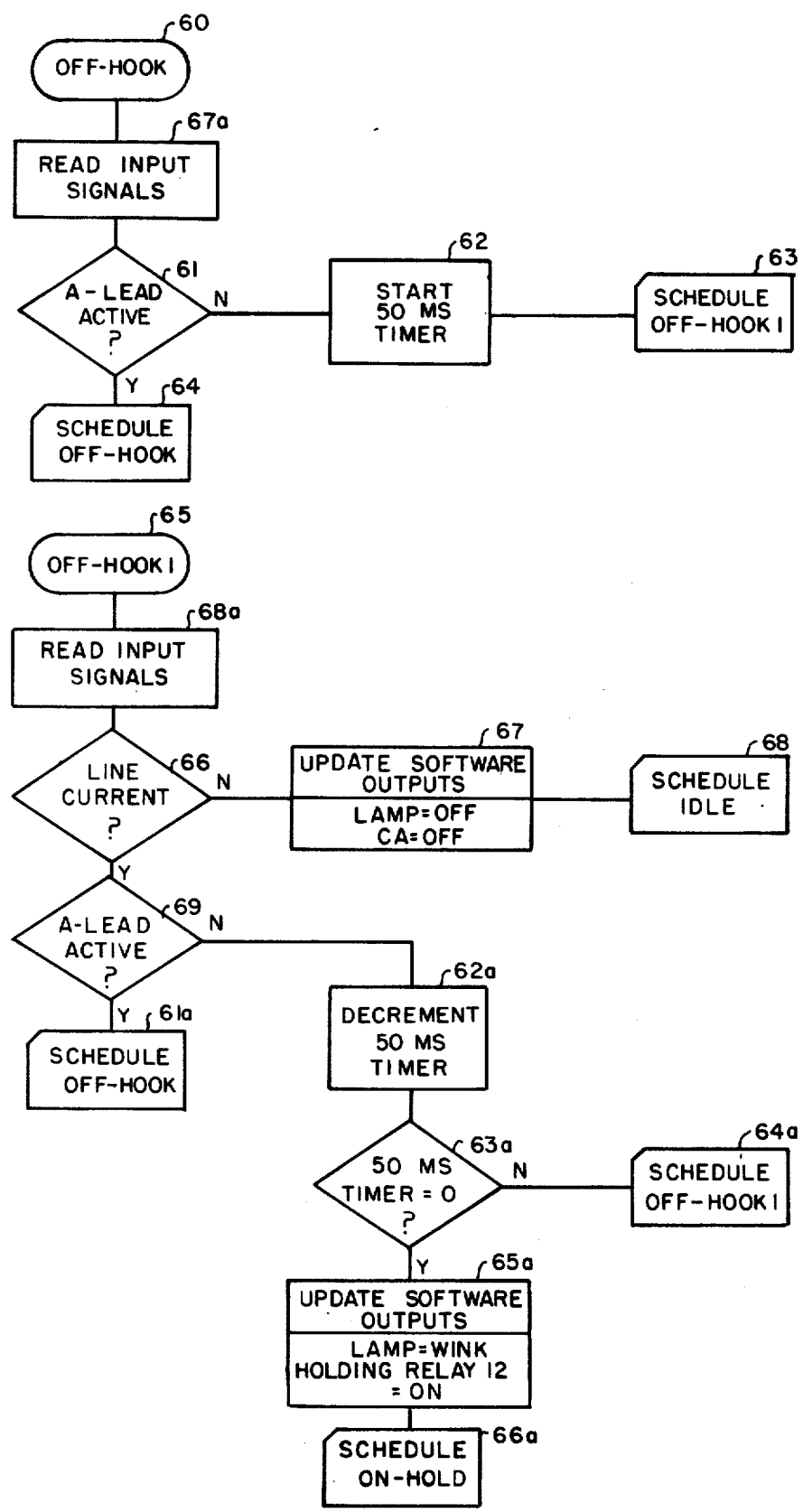
FIG. 6 is a flow chart of the Off-Hook state of the microcomputer.

Referring now to FIG. 6 the flow chart associated with the OFF-HOOK state is shown. The microcomputer remains in the OFF-HOOK state unless a call is terminated, in which case it schedules the IDLE state, or unless the call goes into a hold condition, in which case it schedules the ON-HOLD state.

The microcomputer first checks the A-lead signal on lead A1, and if it is found to be active the microcomputer reschedules the OFF-HOOK state (64) and remains in this looping condition for the duration of the presence of the active A-lead signal. However, if the A-lead signal is found to be inactive the microcomputer starts the 50 millisecond timer (62) and schedules entry point OFF-HOOK 1 (63) of the OFF-HOOK state.

In the next scan the microcomputer enters the OFF-HOOK state via entry point OFF-HOOK 1 (65) and tests the line for line current via contacts 107A. If line current is present the microcomputer then checks the A-lead and if it is also active it reschedules the OFF-HOOK state (61a). However, if there is an absence of line current, the microcomputer resets the bits associated with the steady lamp signal and the common audible signal (67) and schedules the IDLE state (68) for the next scan.

In the event that line current is present but the A-lead signal is inactive the microcomputer decrements the 50 millisecond timer (62a) and then tests it for a value of 0. If this timer has not yet reached the value of 0, the 50 millisecond period has not yet timed out and the microcomputer reschedules the OFF-HOOK routine via entry point OFF-HOOK 1 (64a).

However, if the 50 millisecond timer has timed out as represented by it reaching the value of 0, then the line is determined to be in an on-hold condition since there is a presence of line current and the A-lead signal has disappeared for more than 50 milliseconds. This would result from five consecutive scans entering at OFF-Hook 1 (65) with line current active but A-LEAD inactive. The 50 ms timer was thus decremented once on each scan from its initial setting of 5.

Under such conditions the microcomputer sets the bit required to apply a lamp wink signal on the L1 lead to give a visual indication of the hold condition and it also operates line hold relay 12 to provide a holding bridge across the line to maintain the line current. The microcomputer then schedules the ON-HOLD routine (66a).

Figure 7:
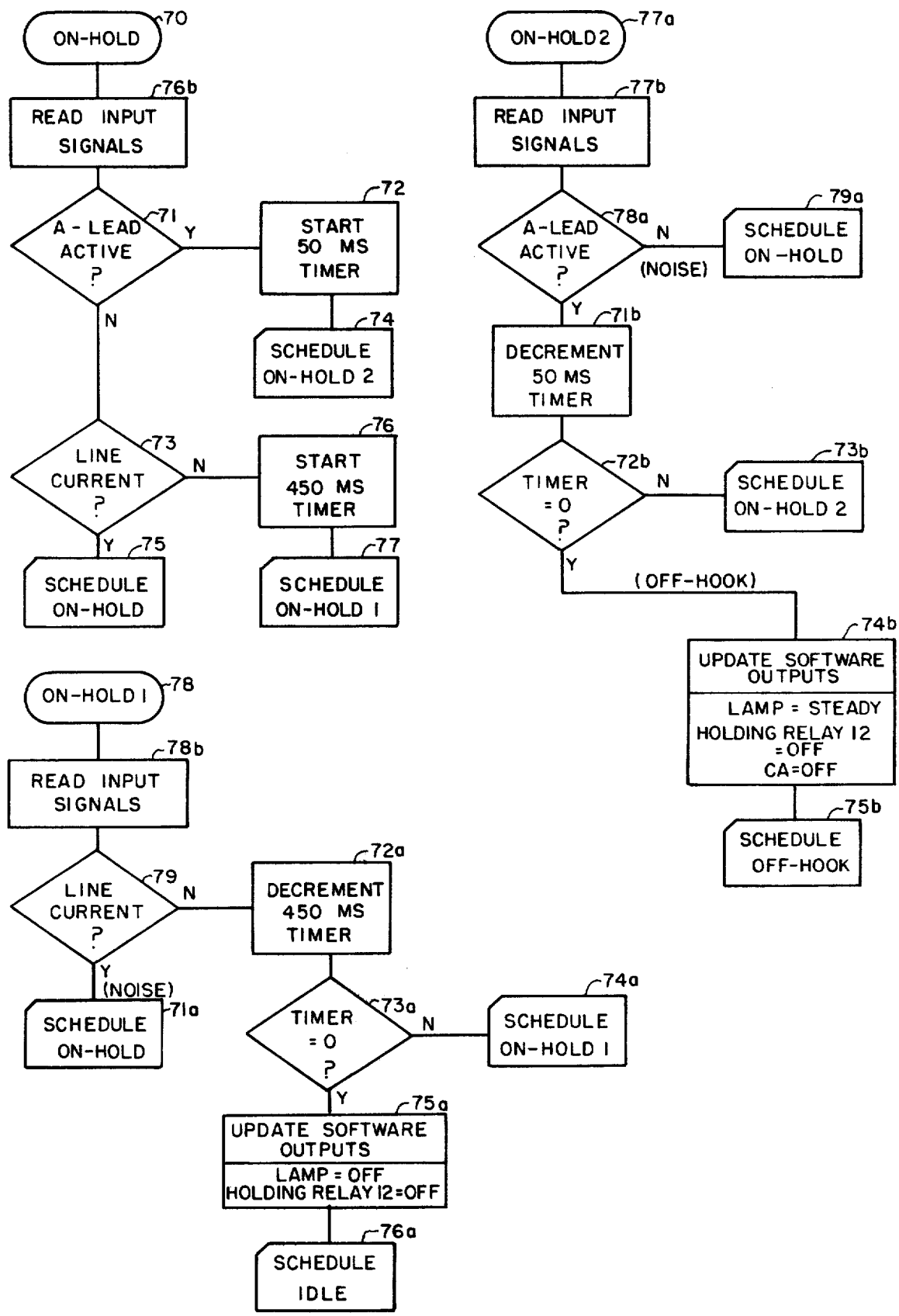
FIG. 7 is a flow chart of the On-Hold state of the microcomputer.

Referring now to FIG. 7 the flow chart for the ON-HOLD state is shown. The microcomputer remains in the ON-HOLD state until it either detects an active A-lead signal, in which case it schedules the OFF-HOOK state, or it detects the absence of line current for a predetermined time, in which case it schedules a return to the IDLE state.

Upon entering the ON-HOLD state (70) the microcomputer checks the A-lead signal. If it is found to be inactive the microcomputer then checks for line current and if it is present it reschedules the ON-HOLD state (75).

However, if the microcomputer detects that the line current has disappeared, then it starts a 450 millisecond timer (76) and schedules entry point 1 of the ON-HOLD state, i.e. ON-HOLD 1 (77). In the next scan the microcomputer enters the ON-HOLD state via entry point ON-HOLD 1 (78) and again checks for a presence of line current. If line current has returned, the previous absence of line current is determined to be noise and the microcomputer reschedules the ON-HOLD routine (71a).

However, if line current again is not present, the microcomputer decrements the 450 millisecond timer (72a) and then checks it for a value of 0. If the timer has timed out to 0, it is assumed that a remote facility has intentionally interrupted line current in order to release a stuck hold condition. The microcomputer then removes hold by scheduling the IDLE state (76a) after first resetting bits required to turn off the line lamps and restore the line holding relay 12 (75a).

If upon entering the ON-HOLD state the microcomputer determines that the A-lead signal is active, it starts a 50 millisecond timer (72) and schedules the ON-HOLD 2 entry point (74). On the next scan the microcomputer enters the ON-HOLD state via entry point ON-HOLD 2 (77a) and again checks the status of the A-lead. If it is found to be inactive the microcomputer reschedules the ON-HOLD state (79a) since the momentary presence of the A-lead signal is determined to be noise.

If however, the A-lead signal is found to be active the microcomputer decrements the 50 millisecond timer (71b) and checks it for a value of 0. If it has not yet timed out by not yet reaching the value 0, the microcomputer reschedules the ON-HOLD state via entry point ON-HOLD 2 (73b). However, if the 50 millisecond timer has timed out, this presence of A-lead signal for 50 milliseconds indicates a removal of the hold condition and a return to the OFF-HOOK state is scheduled (75b) after setting the bits required for a steady lamp signal and resetting the bit associated with line holding relay 12 to release the line bridging circuit.

Thus the microcomputer controls the operation of the microcomputer controlled key telephone line circuit by scheduling, and repetitively re-computing, the software states associated with the five major functions of a key telephone, namely the idle state, the ringing state, the A-lead timing state, the off-hook state and the on-hold state.

It will be obvious to those skilled in the art that numerous modifications of the present invention can be made without departing from the spirit of the invention which shall be limited only by the scope of the claims appended hereto.

What is claimed is:

1. A microcomputer controlled key telephone line circuit for use with a key telephone system including a plurality of lines, and a plurality of key telephones, said lines employed to transmit a ringing voltage and a loop signal, said key telephones each including an audible signaling device, a hold key a plurality of line pickup keys and visual signaling devices associated with said plurality of lines, a plurality of control leads each employed to indicate operation and release of an associated line pickup key of hold key, said line circuit comprising:
   ringing detection means connected to said plurality of lines operated in response to said ringing voltage to generate a ringing signal;
   scanning means connected to said ringing detection means, to said lines and to said control leads, said scanning means operated to scan said lines and said control leads in a predetermined periodic time, said scanning means further operated to detect said ringing signal, said loop signal, operation of said line pickup keys and said hold keys;
   signaling means connected to said scanning means, to said visual signaling devices, said audible signaling devices and said lines, operated in response to detection of operation of each of said line pickup keys to signal associated visual signaling devices, in a first manner, further operated in response to said detected ringing signal on each of said lines to signal associated visual signaling devices, in a second manner, and to signal associated audible signaling devices, and further operated in response to detection of operation of each of said hold keys to signal associated visual signaling devices in a third manner and to generate an associated bridging signal; and bridging means connected to said lines and said signaling means, operated in response to said bridging signal to bridge an associated line.

2. A microcomputer controlled key telephone line circuit as claimed in claim 1, wherein there is further included:
line signaling means connected to said lines and to said signaling means; said signaling means further operated in response to detection of operation of said hold key to generate a hold signal, and said line signaling means operated to couple said hold signal to said line.

3. A microcomputer controlled key telephone line circuit as claimed in claim 1, wherein there is further included:
timing means connected to said scanning means operated in response to detection of said ringing signal, said loop signal, operation of each of said line pickup keys and operation of each of said hold keys, to determine the validity of said signals and said key operations by timing the duration of said signals and said key operations for predetermined times.

4. A microcomputer controlled key telephone line circuit as claimed in claim 1, wherein: said scanning means comprise said microcomputer.

5. A microcomputer controlled key telephone line circuit as claimed in claim 1, wherein: said signaling means comprise said microcomputer.

6. A microcomputer controlled key telephone line circuit as claimed in claim 3, wherein: said timing means comprise said microcomputer.

* * * * *